US008842711B2

(12) United States Patent
Zeira et al.

(10) Patent No.: US 8,842,711 B2
(45) Date of Patent: *Sep. 23, 2014

(54) USER EQUIPMENT FOR CONTROLLING TRANSMISSION POWER LEVELS

(75) Inventors: Ariela Zeira, Huntington, NY (US); Sung-Hyuk Shin, Northvale, NJ (US); Stephen G. Dick, Nesconset, NY (US)

(73) Assignee: Intel Corporation, Santa Clara, CA (US)

( * ) Notice: Subject to any disclaimer, the term of this patent is extended or adjusted under 35 U.S.C. 154(b) by 195 days.

This patent is subject to a terminal disclaimer.

(21) Appl. No.: 12/330,912

(22) Filed: Dec. 9, 2008

(65) Prior Publication Data

US 2009/0080496 A1 Mar. 26, 2009

Related U.S. Application Data

(63) Continuation of application No. 11/545,665, filed on Oct. 10, 2006, now abandoned, which is a continuation of application No. 10/435,796, filed on May 12, 2003, now Pat. No. 7,120,188, which is a continuation of application No. 09/533,423, filed on Mar. 22, 2000, now Pat. No. 6,603,797.

(51) Int. Cl.
*H04B 1/00* (2006.01)
*H04W 52/22* (2009.01)
*H04W 52/12* (2009.01)
*H04W 52/24* (2009.01)

(52) U.S. Cl.
CPC ............ *H04W 52/225* (2013.01); *H04W 52/12* (2013.01); *H04W 52/24* (2013.01)
USPC ........... 375/130; 375/135; 375/136; 375/146; 375/147

(58) Field of Classification Search
CPC ... H04W 52/242; H04W 40/08; H04W 52/32; H04W 52/0245; H04W 74/004; H04B 1/69; H04B 7/0669; H04B 17/0045; H04B 1/406
USPC .......... 375/130, 135, 136, 146, 147; 455/500, 455/522, 574, 423, 67.11, 426.2, 435.1
See application file for complete search history.

(56) References Cited

U.S. PATENT DOCUMENTS

| 4,868,795 A | 9/1989 | McDavid et al. |
| 5,056,109 A | 10/1991 | Gilhousen et al. |

(Continued)

FOREIGN PATENT DOCUMENTS

| EP | 0462952 | 12/1991 |
| EP | 0610030 | 8/1994 |

(Continued)

OTHER PUBLICATIONS

Zeira et al., "Text Proposal for S1.24," May, 1999.

(Continued)

*Primary Examiner* — Dhaval Patel
(74) *Attorney, Agent, or Firm* — Blakely, Sokoloff, Taylor & Zafman LLP (57) ABSTRACT

A user equipment (UE) with circuitry configured to determine a pathloss associated with a received signal. The circuitry is configured to receive an adjustment and adjust a value in response to the received adjustment. The circuitry is configured to determine a transmit power level based on multiplying the determined pathloss by a parameter and adding the adjusted value to a result of the multiplying, wherein the parameter is value in the range of 0 to 1. The circuitry is configured to transmit a signal at the determined transmit power level.

36 Claims, 5 Drawing Sheets

(56) References Cited

U.S. PATENT DOCUMENTS

| | | | |
|---|---|---|---|
| 5,542,111 | A | 7/1996 | Ivanov et al. |
| 5,564,074 | A | 10/1996 | Juntti |
| 5,839,056 | A | 11/1998 | Hakkinen |
| 5,845,208 | A | 12/1998 | Hottinen et al. |
| 5,859,838 | A | 1/1999 | Soliman |
| 6,101,179 | A | 8/2000 | Solimon |
| 6,108,561 | A | 8/2000 | Mallinckrodt |
| 6,175,586 | B1 | 1/2001 | Lomp |
| 6,175,745 | B1 * | 1/2001 | Bringby et al. ............ 455/522 |
| 6,188,678 | B1 | 2/2001 | Prescott et al. |
| 6,285,665 | B1 | 9/2001 | Chuah |
| 6,366,778 | B1 | 4/2002 | Bender et al. |
| 6,373,823 | B1 | 4/2002 | Chen et al. |
| 6,449,462 | B1 | 9/2002 | Gunnarsson et al. |
| 6,519,236 | B1 | 2/2003 | Haartsen et al. |
| 6,577,617 | B1 | 6/2003 | Ue et al. |
| 6,597,723 | B1 * | 7/2003 | Zeira et al. ............ 375/130 |
| 6,603,797 | B1 * | 8/2003 | Zeira et al. ............ 375/130 |
| 6,603,798 | B2 * | 8/2003 | Zeira et al. ............ 375/130 |
| 6,628,956 | B2 | 9/2003 | Bark et al. |
| 6,658,050 | B1 | 12/2003 | Rahmesh et al. |
| 6,956,889 | B2 * | 10/2005 | Zeira et al. ............ 375/130 |

FOREIGN PATENT DOCUMENTS

| | | |
|---|---|---|
| EP | 0682419 | 11/1995 |
| EP | 0500689 | 4/1998 |
| IL | 126522 | 9/2001 |
| IL | 132349 | 4/2002 |
| IL | 141478 | 2/2003 |
| IL | 141909 | 12/2003 |
| JP | 7-074727 | 3/1995 |
| WO | 97/15159 | 4/1997 |
| WO | 97/49197 | 12/1997 |
| WO | 9749197 | 12/1997 |
| WO | 98/45962 | 10/1998 |
| WO | 9845962 | 10/1998 |
| WO | 99/07105 | 2/1999 |
| WO | 9907105 | 2/1999 |

OTHER PUBLICATIONS

3G TS 25.331 V3.2.0 (Mar. 2000), "Technical Specification Group Radio Access Network; RRC Protocol Specification", Third Generation Partnership Project, Release 1999, pp. 117-118.

3G TS 25.331 V3.1.0 (Jan. 2000), " Technical Specification Group Radio Access Network; RRC Protocol Specification (3G TS 25.331 version 3.1.0 Release 1999)", Third Generation Partnership Project, pp. 98-99.

3G TS 25.331 V1.0.0 (Apr. 1999), Technical Specification Group (TSG) RAN; Working Group 2 (WG2); RRC Protocol Specification.

ETSI TS 125 331 V3.1.0 (Jan. 2000); Universal Mobile Telecommunications System (UMTS); RRC Protocol Specification; (EG TS 25.331 version 3.1.0 Release 1999).

3G TS 25.225 V3.2.0 (Mar. 2000); Technical Specification Group Radio Access Network; Physical Layer—Measurements (TDD) (Release 1999).

TS 25.221 V1.0.0 (Apr. 1999); Technical Specification Group (TSG); Radio Acces Network (RAN); Working Group 1 (WG1); Physical Channels and Mapping of Transport Channels Onto Physical Channels (TDD).

3G TS 25.221 V3.2.0 (Mar. 2000); Technical Specification Group Radio Access Network; Physical Channels nand Mapping of Transport Channels Onto Physical Channels (TDD) (Release 1999).

TS 25.102 V1.0.0 (Apr. 1999); Technical Specification Group (TSG) RAN WG4; UTRA (UE) TDD; Radio Transmission and Reception.

3G TS 25.102 V3.2.0 (Mar. 2000); Technical Specification Group Radio Access Networks; UTRA (UE) TDD; Radio Transmission and reception 3G TS 25.102 Version 3.2.0 Release 1999.

3G TS 25.224 V3.2.0 (Mar. 2000); Technical Specification Group Radio Access Network; Physical Layers Procedures (TDD); (Release 1999).

3GPP (S1.24) V1.0.1 Mar. 1999; TDD, Physical Layer Procedures Description.

"Specification of Air-Interface for the 3G Mobil System," Version 1.0, ARIB, Jan. 14, 1999.

Zeira et al., "Combined Closed-Loop/Open-Loop Power Control Process for Time Division Duplexing," Apr. 1999.

Zeira et al., "Performance of Weighted Open Loop Scheme for Uplink Power Control in TDD Mode," May 1999.

Third Generation Partnership Project, "Technical Specification Group Radio Access Network; Physical channels and mapping of transport channels onto physical channels (TDD) (Release 1999)," 3GPP TS 25.221 V3.2.0 (Mar. 2000).

Third Generation Partnership Project, "Technical Specification Group Radio Access Network; Radio Resource Control (RRC); Protocol Specification (Release 1999)," 3GPP TS 25.331 V3.2.0 (Mar. 2000).

Third Generation Partnership Project, "Technical Specification Group Radio Access Network; UTRA (UE) TDD; Radio Transmission and Reception (Release 1999)," 3GPP TS 25.102 V3.2.0 (Mar. 2000).

Third Generation Partnership Project, "Technical Specification Group Radio Access Network; UTRAN Overall Description (Release 1999)," 3GPP TS 25.401 V3.2.0 (Mar. 2000).

Third Generation Partnership Project, Technical Specification Group Radio Access Network; UTRAN Iub Interface NBAP Signalling (Release 1999), 3GPP TS 25.433 V3.1.0 (Mar. 2000).

Third Generation Partnership Project, "Technical Specification Group Radio Access Network; UTRAN Iur interface Radio Network Subsystem Application Part (RNSAP) signaling (Release 1999)," 3GPP TS 25.423 V3.1.0 (Mar. 2000).

Third Generation Partnership Project, "Technical Specification Group Radio Access Network; Radio interface protocol architecture (Release 1999)," 3GPP TS 25.301 V 3.4.0 (Mar. 2000).

Third Generation Partnership Project, "Technical Specification Group Radio Access Network; Physical layer procedures (TDD) (Release 1999)," 3GPP TS 25.224 V3.2.0 (Mar. 2000).

Third Generation Partnership Project, "Technical Specification Group Radio Access Network; Physical layer; Measurements (TDD) (Release 1999)," 3GPP TS 25.225 V3.2.0 (Mar. 2000).

Third Generation Partnership Project, "Technical Specification Group Radio Access Network; Spreading and modulation (TDD) (Release 1999)," 3GPP TS 25.223 V3.2.0 (Mar. 2000).

Zeira et al., °Text Proposal for S1.24,° May 1999.

3G TS 25.331 V3.1.0 (Jan. 2000), "Technical Specification Group Radio Access Network; RRC Protocol Specification (3G TS 25.331 version 3.1.0 Release 1999)", Third Generation Partnership Project, pp. 98-99.

3G TS 25.221 V3.2.0 (Mar. 2000); Technical Specification Group Radio Access Network; Physical Channels and Mapping of Transport Channels Onto Physical Channels (TDD) (Release 1999).

Zeira et al., "Combined Closed-Loop/Open-Loop Power Control Process for Time Division Duplexing," Apr. 1999 .

3G TS 25.331 V3.2.0 (Mar. 2000), "Technical Specification Group Radio Access Network; RRC Protocol Specification", Third Generation Partnership Project, Release 199, pp. 117-118.

3GPP (S1.24) V1.0.1 1999-03; TDD, Physical Layer Procedures Description.

* cited by examiner

USER EQUIPMENT FOR CONTROLLING TRANSMISSION POWER LEVELS

CROSS REFERENCE TO RELATED APPLICATIONS

This application is a continuation of U.S. application Ser. No. 11/545,665, filed Oct. 10, 2006, which is a continuation of U.S. application Ser. No. 10/435,796, filed May 12, 2003, which issued on Oct. 10, 2006 as U.S. Pat. No. 7,120,188, which is a continuation of U.S. application Ser. No. 09/533, 423, filed Mar. 22, 2000, which issued on Aug. 5, 2003 as U.S. Pat. No. 6,603,797; which are incorporated herein by reference as if fully set forth.

FIELD OF INVENTION

This invention generally relates to spread spectrum time division duplex (TDD) communication systems. More particularly, the present invention relates to a system and method for controlling transmission power within TDD communication systems.

BACKGROUND

Figure 1:
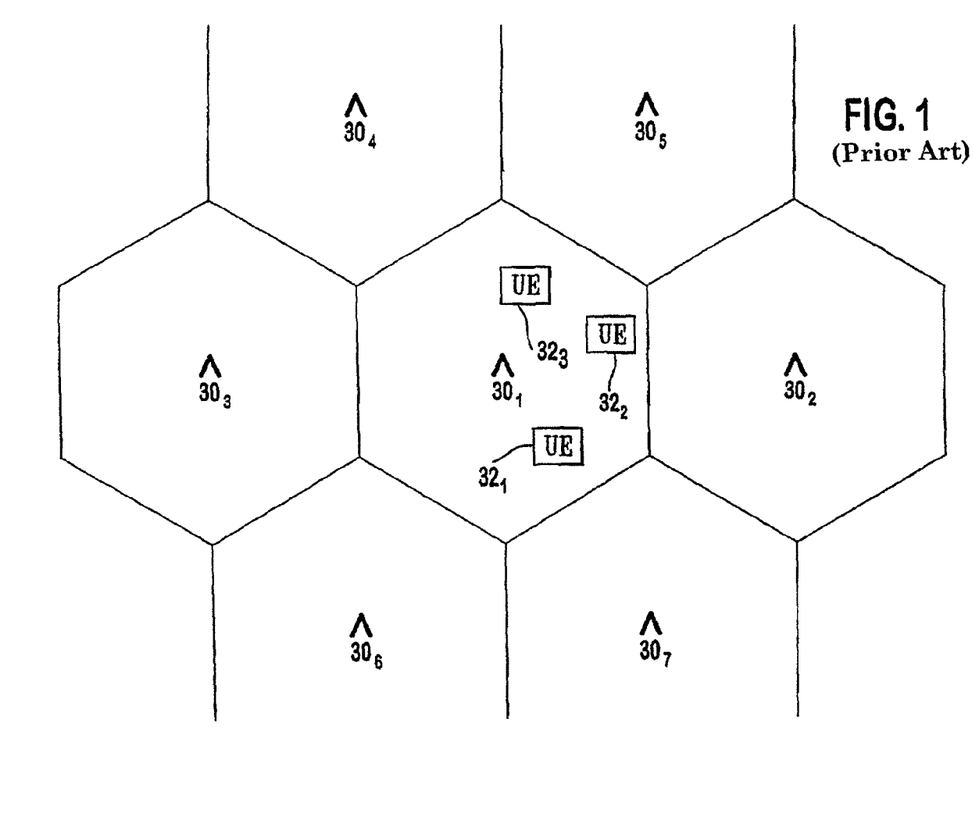
FIG. 1 illustrates a prior art TDD system.

FIG. 1 depicts a wireless spread spectrum time division duplex (TDD) communication system. The system has a plurality of base stations $30_1$-$30_7$. Each base station $30_1$ communicates with user equipment (UEs) $32_1$-$32_3$ in its operating area. Communications transmitted from a base station $30_1$ to a UE $32_1$ are referred to as downlink communications and communications transmitted from a UE $32_1$ to a base station $30_1$ are referred to as uplink communications.

Figure 2:
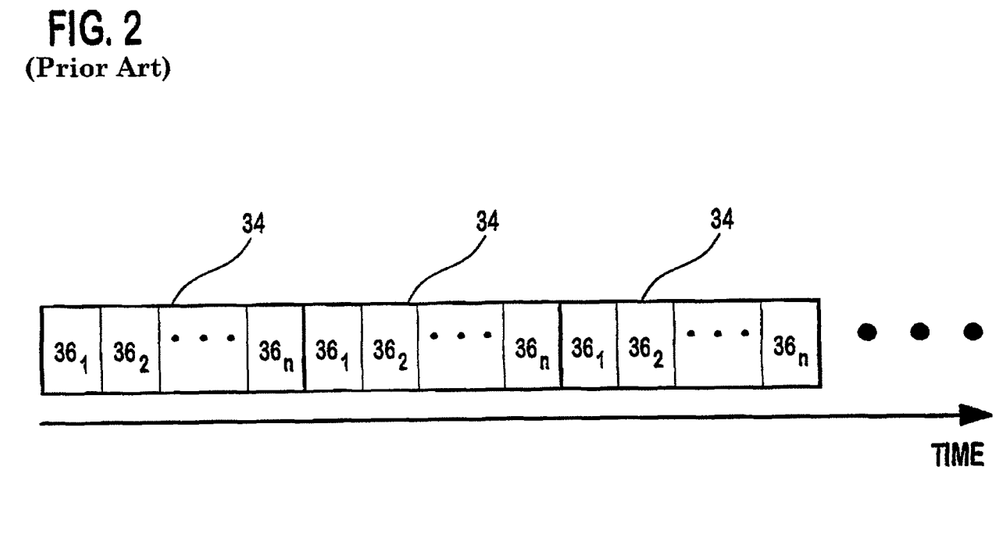
FIG. 2 illustrates time slots in repeating frames of a TDD system.

In addition to communicating over different frequency spectrums, spread spectrum TDD systems carry multiple communications over the same spectrum. The multiple signals are distinguished by their respective chip code sequences (codes). Also, to more efficiently use the spread spectrum, TDD systems as illustrated in FIG. 2 use repeating frames 34 divided into a number of time slots $36_1$-$36_n$, such as sixteen time slots. In such systems, a communication is sent in selected time slots $36_1$-$36_n$ using selected codes. Accordingly, one frame 34 is capable of carrying multiple communications distinguished by both time slot and code. The combination of a single code in a single time slot is referred to as a resource unit. Based on the bandwidth required to support a communication, one or multiple resource units are assigned to that communication.

Most TDD systems adaptively control transmission power levels. In a TDD system, many communications may share the same time slot and spectrum. When a UE $32_1$ or base station $30_1$ is receiving a specific communication, all the other communications using the same time slot and spectrum cause interference to the specific communication. Increasing the transmission power level of one communication degrades the signal quality of all other communications within that time slot and spectrum. However, reducing the transmission power level too far results in undesirable signal to noise ratios (SNRs) and bit error rates (BERs) at the receivers. To maintain both the signal quality of communications and low transmission power levels, transmission power control is used.

One approach using transmission power control in a code division multiple access (CDMA) communication system is described in U.S. Pat. No. 5,056,109 (Gilhousen et al.). A transmitter sends a communication to a particular receiver. Upon reception, the received signal power is measured. The received signal power is compared to a desired received signal power. Based on the comparison, a control bit is sent to the transmitter either increasing or decreasing transmission power by a fixed amount. Since the receiver sends a control signal to the transmitter to control the transmitter's power level, such power control techniques are commonly referred to as closed loop.

Under certain conditions, the performance of closed loop systems degrades. For instance, if communications sent between a UE and a base station are in a highly dynamic environment, such as due to the UE moving, such systems may not be able to adapt fast enough to compensate for the changes. The update rate of closed loop power control in TDD is typically 100 cycles per second which is not sufficient for fast fading channels. Accordingly, there is a need for alternate approaches to maintain signal quality and low transmission power levels.

SUMMARY

A user equipment (UE) is disclosed with circuitry configured to determine a pathloss associated with a received signal. The circuitry is configured to receive an adjustment and adjust a value in response to the received adjustment. The circuitry is configured to determine a transmit power level based on multiplying the determined pathloss by a parameter and adding the adjusted value to a result of the multiplying, wherein the parameter is value in the range of 0 to 1. The circuitry is configured to transmit a signal at the determined transmit power level.

DETAILED DESCRIPTION

Figure 3:
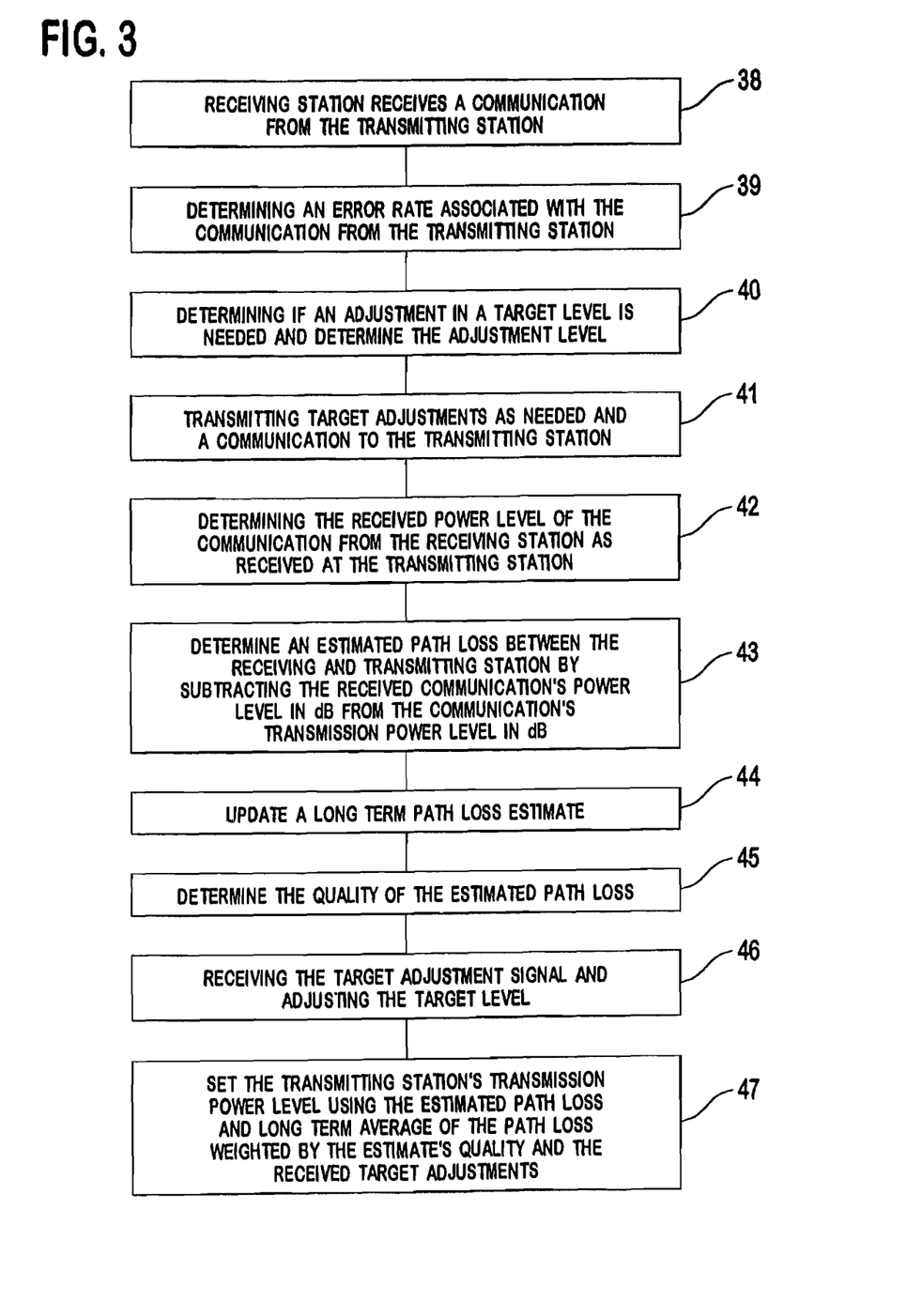
FIG. 3 is a flow chart of outer loop/weighted open loop power control.
Figure 4:
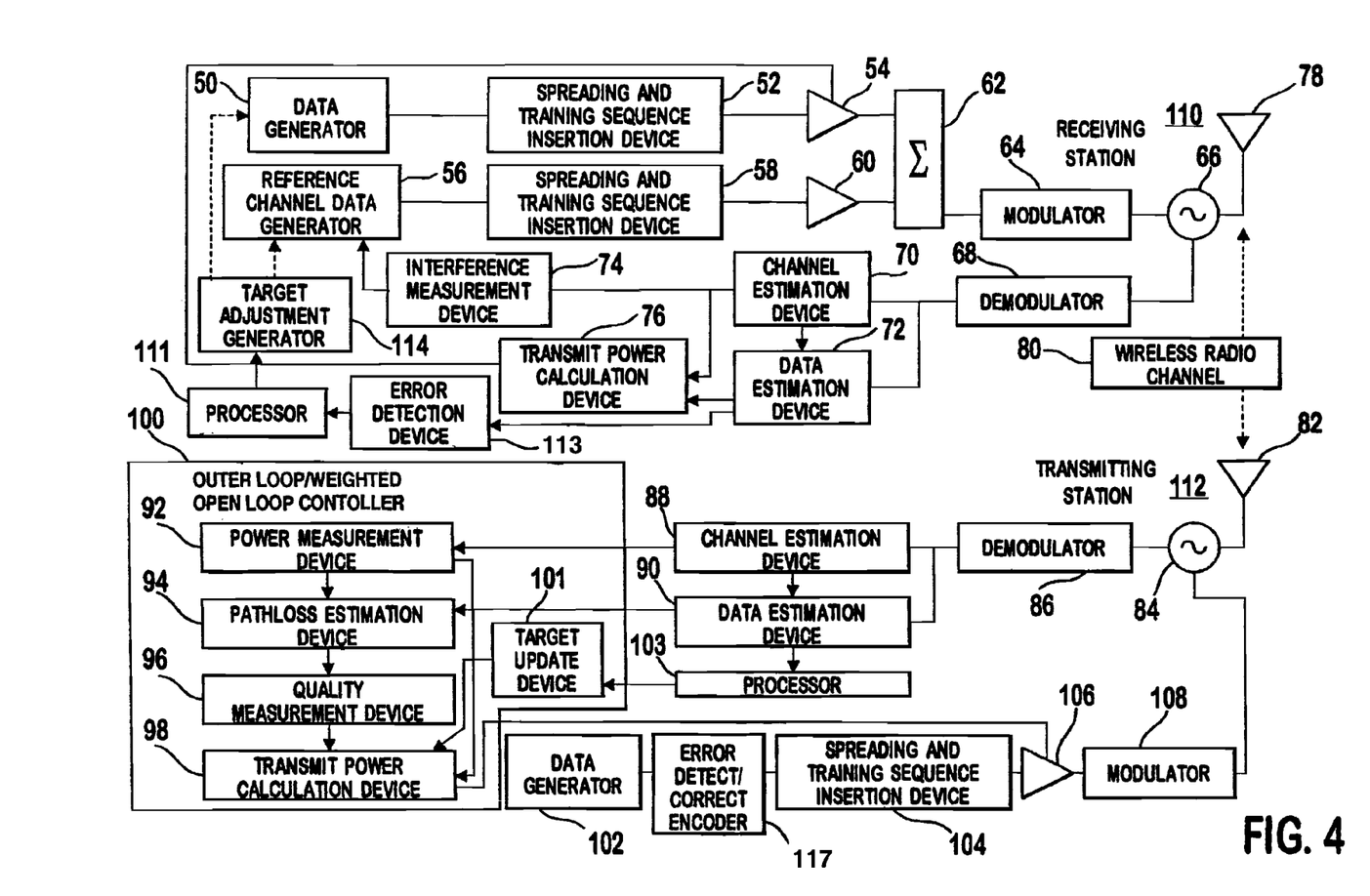
FIG. 4 is a diagram of components of two communication stations using outer loop/weighted open loop power control.

The preferred embodiments will be described with reference to the drawing figures where like numerals represent like elements throughout. Outer loop/weighted open loop power control will be explained using the flow chart of FIG. 3 and the components of two simplified communication stations 110, 112 as shown in FIG. 4. For the following discussion, the communication station having its transmitter's power controlled is referred to as the transmitting station 112 and the communication station receiving power controlled communications is referred to as the receiving station 110. Since outer loop/weighted open loop power control may be used for uplink, downlink or both types of communications, the transmitter having its power controlled may be associated with the base station $30_1$, UE $32_1$ or both. Accordingly, if both uplink and downlink power control are used, the receiving and transmitting station's components are associated with both the base station $30_1$ and UE $32_1$.

The receiving station 110 receives various radio frequency signals including communications from the transmitting station 112 using an antenna 78, or alternatively, an antenna array, step 38. The received signals are passed thorough an isolator 66 to a demodulator 68 to produce a baseband signal. The baseband signal is processed, such as by a channel estimation device 70 and a data estimation device 72, in the time slots and with the appropriate codes assigned to the transmitting station's communication. The channel estimation device 70 commonly uses the training sequence component in the baseband signal to provide channel information, such as channel impulse responses. The channel information is used by the data estimation device 72, the interference measurement device 74, and the transmit power calculation device 76. The data estimation device 72 recovers data from the channel by estimating soft symbols using the channel information. Prior to transmission of the communication from the transmitting station 112, the data signal of the communication is error encoded using an error detection/correction encoder 117. The error encoding scheme is typically a circular redundancy code (CRC) followed by a forward error correction encoding, although other types of error encoding schemes may be used. Using the soft symbols produced by the data estimation device 72, an error detection device 113 detects errors in the soft symbols. A processor 111 analyzes the detected error and determines an error rate for the received communication, step 39. Based on the error rate, the processor 111 determines the amount, if any, a target level, such as a target signal to interference ration ($SIR_{TARGET}$), needs to be changed at the transmitting station 112, step 40. Based on the determined amount, a target adjustment signal is generated by the target adjustment generator 114. The target adjustment is subsequently sent to the transmitting station, step 41. The target adjustment is signaled to the transmitting station 112, such as using a dedicated or a reference channel as shown in FIG. 4, step 41.

One technique to determine the amount of adjustment in the target level uses an upper and lower threshold. If the determined error rate exceeds an upper threshold, the target level is set at an unacceptably low level and needs to be increased. A target level adjustment signal is sent indicating an increase in the target level. If the determined error rate is below a second threshold, the target level is set at an unnecessarily high level and the target level can be decreased. By reducing the target level, the transmitting station's power level is decreased reducing interference to other communications using the same time slot and spectrum. To improve performance, as soon as the error rate exceeds the upper limit, a target adjustment is sent. As a result, high error rates are improved quickly and lower error rates are adjusted slowly, such as once per 10 seconds. If the error rate is between the thresholds, a target adjustment is not sent maintaining the same target level.

Applying the above technique to a system using CRC and FEC encoding follows. Each CRC block is checked for an error. Each time a frame is determined to have an error, a counter is incremented. As soon as the counter exceeds an upper threshold, such as 1.5 to 2 times the desired block error rate (BLER), a target adjustment is sent increasing the target level. To adjust the $SIR_{TARGET}$ at the transmitting station 112, the increase in the $SIR_{TARGET}$ is sent ($SIR_{INC}$), which is typically in a range of 0.25 dB to 4 dB. If the number of CRC frames encountered exceeds a predetermined limit, such as 1000 blocks, the value of the counter is compared to a lower threshold, such as 0.2 to 0.6 times the desired BLER. If the number of counted block errors is below the lower threshold, a target adjustment signal is sent decreasing the target level, $SIR_{DEC}$. A typical range of $SIR_{DEC}$ is 0.25 to 4 dB. The value of $SIR_{DEC}$ may be based on $SIR_{INC}$ and a target block error rate, $BLER_{TARGET}$. The $BLER_{TARGET}$ is based on the type of service. A typical range for the $BLER_{TARGET}$ is 0.1% to 10%. Equation 1 illustrates one such approach for determining $SIR_{DEC}$.

$$SIR_{DEC}=SIR_{INC} \times BLER_{TARGET}/(1-BLER_{TARGET})$$ Equation 1

If the count is between the thresholds for the predetermined block limit, a target adjustment signal is not sent.

Alternately, a single threshold may be used. If the error rate exceeds the threshold, the target level is increased. If the error rate is below the threshold, the target is decreased. Additionally, the target level adjustment signal may have several adjustment levels, such as from 0 dB to ±4 dB in 0.25 dB increments based on the difference between the determined error rate and the desired error rate.

The interference measurement device 74 of the receiving station 110 determines the interference level in dB, $I_{RS}$, within the channel, based on either the channel information, or the soft symbols generated by the data estimation device 72, or both. Using the soft symbols and channel information, the transmit power calculation device 76 controls the receiving station's transmission power level by controlling the gain of an amplifier 54.

For use in estimating the pathloss between the receiving and transmitting stations 110, 112 and sending data, the receiving station 110 sends a communication to the transmitting station 112, step 41. The communication may be sent on any one of the various channels. Typically, in a TDD system, the channels used for estimating pathloss are referred to as reference channels, although other channels may be used. If the receiving station 110 is a base station $30_1$, the communication is preferably sent over a downlink common channel or a common control physical channel (CCPCH). Data to be communicated to the transmitting station 112 over the reference channel is referred to as reference channel data. The reference data may include, as shown, the interference level, $I_{RS}$, multiplexed with other reference data, such as the transmission power level, $T_{RS}$. The interference level, $I_{RS}$, and reference channel power level, $I_{RS}$, may be sent in other channels, such as a signaling channel.

The reference channel data is generated by a reference channel data generator 56. The reference data is assigned one or multiple resource units based on the communication's bandwidth requirements. A spreading and training sequence insertion device 58 spreads the reference channel data and makes the spread reference data time-multiplexed with a training sequence in the appropriate time slots and codes of the assigned resource units. The resulting sequence is referred to as a communication burst. The communication burst is subsequently amplified by an amplifier 60. The amplified communication burst may be summed by a sum device 62 with any other communication burst created through devices, such as a data generator 50, spreading and training sequence insertion device 52 and amplifier 54.

The summed communication bursts are modulated by a modulator 64. The modulated signal is passed thorough an isolator 66 and radiated by an antenna 78 as shown or, alternately, through an antenna array. The radiated signal is passed through a wireless radio channel 80 to an antenna 82 of the transmitting station 112. The type of modulation used for the transmitted communication can be any of those known to those skilled in the art, such as direct phase shift keying (DPSK) or quadrature phase shift keying (QPSK).

The antenna 82 or, alternately, antenna array of the transmitting station 112 receives various radio frequency signals including the target adjustments. The received signals are passed through an isolator 84 to a demodulator 86 to produce a baseband signal. The baseband signal is processed, such as by a channel estimation device 88 and a data estimation device 90, in the time slots and with the appropriate codes assigned to the communication burst of the receiving station 110. The channel estimation device 88 commonly uses the training sequence component in the baseband signal to provide channel information, such as channel impulse responses. The channel information is used by the data estimation device 90 and a power measurement device 92.

The power level of the processed communication corresponding to the reference channel, $R_{TS}$, is measured by the power measurement device 92 and sent to a pathloss estimation device 94, step 42. Both the channel estimation device 88 and the data estimation device 90 are capable of separating the reference channel from all other channels. If an automatic gain control device or amplifier is used for processing the received signals, the measured power level is adjusted to correct for the gain of these devices at either the power measurement device 92 or pathloss estimation device 94. The power measurement device is a component of an outer loop/weighted open loop controller 100. As shown in FIG. 4, the outer loop/weighted open loop controller 100 comprises the power measurement device 92, pathloss estimation device 94, quality measurement device 96, target update device 101, and transmit power calculation device 98.

To determine the path loss, L, the transmitting station 112 also requires the communication's transmitted power level, $T_{RS}$. The communication's transmitted power level, $T_{RS}$, may be sent along with the communication's data or in a signaling channel. If the power level, $T_{RS}$, is sent along with the communication's data, the data estimation device 90 interprets the power level and sends the interpreted power level to the pathloss estimation device 94. If the receiving station 110 is a base station 30$_1$, preferably the transmitted power level, $T_{RS}$, is sent via the broadcast channel (BCH) from the base station 30$_1$. By subtracting the received communication's power level, $R_{TS}$, from the sent communication's transmitted power level, $T_{RS}$, the pathloss estimation device 94 estimates the path loss, L, between the two stations 110, 112, step 43. Additionally, a long term average of the pathloss, $L_0$, is updated, step 44. The long term average of the pathloss, $L_0$, is an average of the pathloss estimates. In certain situations, instead of transmitting the transmitted power level, $T_{RS}$, the receiving station 110 may transmit a reference for the transmitted power level. In that case, the pathloss estimation device 94 provides reference levels for the pathloss, L.

Since TDD systems transmit downlink and uplink communications in the same frequency spectrum, the conditions these communications experience are similar. This phenomenon is referred to as reciprocity. Due to reciprocity, the path loss experienced for the downlink will also be experienced for the uplink and vice versa. By adding the estimated path loss to a target level, a transmission power level for a communication from the transmitting station 112 to the receiving station 110 is determined.

If a time delay exists between the estimated path loss and the transmitted communication, the path loss experienced by the transmitted communication may differ from the calculated loss. In TDD where communications are sent in differing time slots 36$_1$-36$_n$, the time slot delay between received and transmitted communications may degrade the performance of an open loop power control system. To overcome these drawbacks, weighted open loop power control determines the quality of the estimated path loss using a quality measurement device 96, step 45, and weights the estimated path loss accordingly, L, and long term average of the pathloss, $L_0$.

To enhance performance further in outer loop/weighted open loop, a target level is adjusted. A processor 103 converts the soft symbols produced by the data estimation device 90 to bits and extracts the target adjustment information, such as a $SIR_{TARGET}$ adjustment. A target update device 101 adjusts the target level using the target adjustments, step 46. The target level may be a $SIR_{TARGET}$ or a target received power level at the receiving station 110.

The transmit power calculation device 98 combines the adjusted target level with the weighted path loss estimate, L, and long term average of the pathloss estimate, $L_0$, to determine the transmission power level of the transmitting station, step 47.

Data to be transmitted in a communication from the transmitting station 112 is produced by data generator 102. The data is error detection/correction encoded by error detection/correction encoder 117. The error encoded data is spread and time-multiplexed with a training sequence by the training sequence insertion device 104 in the appropriate time slots and codes of the assigned resource units producing a communication burst. The spread signal is amplified by an amplifier 106 and modulated by modulator 108 to radio frequency. The gain of the amplifier is controlled by the transmit power calculation device 98 to achieve the determined transmission power level. The power controlled communication burst is passed through the isolator 84 and radiated by the antenna 82.

The following is one outer loop/weighted open loop power control algorithm. The transmitting stations's transmission power level in decibels, $P_{TS}$, is determined using Equation 2.

$$a.\ P_{TS} = SIR_{TARGET} + I_{RS} + \alpha(L - L_0) + L_0 + \text{CONSTANT VALUE} \qquad \text{Equation 2}$$

The $SIR_{TARGET}$ has an adjusted value based on the received target adjustment signals. For the downlink, the initial value of $SIR_{TARGET}$ is known at the transmitting station 112. For uplink power control, $SIR_{TARGET}$ is signaled from the receiving station 110 to the transmitting station 112. Additionally, a maximum and minimum value for an adjusted $SIR_{TARGET}$ may also be signaled. The adjusted $SIR_{TARGET}$ is limited to the maximum and minimum values. $I_{RS}$ is the measure of the interference power level at the receiving station 110.

L is the path loss estimate in decibels, $T_{RS} - R_{TS}$, for the most recent time slot 36$_1$-36$_n$ that the path loss was estimated. $L_0$, the long term average of the path loss in decibels, is the running average of the pathloss estimate, L. The CONSTANT VALUE is a correction term. The CONSTANT VALUE corrects for differences in the uplink and downlink channels, such as to compensate for differences in uplink and downlink gain. Additionally, the CONSTANT VALUE may provide correction if the transmit power reference level of the receiving station is transmitted, instead of the actual transmit power, $T_{RS}$. If the receiving station 110 is a base station, the CONSTANT VALUE is preferably sent via a Layer 3 message.

The weighting value, $\alpha$, is a measure of the quality of the estimated path loss and is, preferably, based on the number of time slots 36$_1$-36$_n$ between the time slot, n, of the last path loss estimate and the first time slot of the communication transmitted by the transmitting station 112. The value of $\alpha$ is between zero and one. Generally, if the time difference between the time slots is small, the recent path loss estimate will be fairly accurate and $\alpha$ is set at a value close to one. By contrast, if the time difference is large, the path loss estimate may not be accurate and the long term average path loss measurement is most likely a better estimate for the path loss.

Accordingly, α is set at a value closer to one.

a. Equations 3 and 4 are equations for determining α.

b. $\alpha = 1 - (D-1)/(D_{max}-1)$  Equation 3 c. $\alpha = \max\{1-(D-1)/(D_{max-allowed}-1), 0\}$  Equation 4

The value, D, is the number of time slots $36_1$-$36_n$ between the time slot of the last path loss estimate and the first time slot of the transmitted communication which will be referred to as the time slot delay. If the delay is one time slot, α is one. $D_{max}$ is the maximum possible delay. A typical value for a frame having fifteen time slots is seven. If the delay is $D_{max}$, α is zero. $D_{max-allowed}$ is the maximum allowed time slot delay for using open loop power control. If the delay exceeds $D_{max-allowed}$, open loop power control is effectively turned off by setting α=0. Using the transmit power level, $P_{TS}$, determined by a transmit power calculation device 98 the transmit power of the transmitted communication is set.

Figure 5:
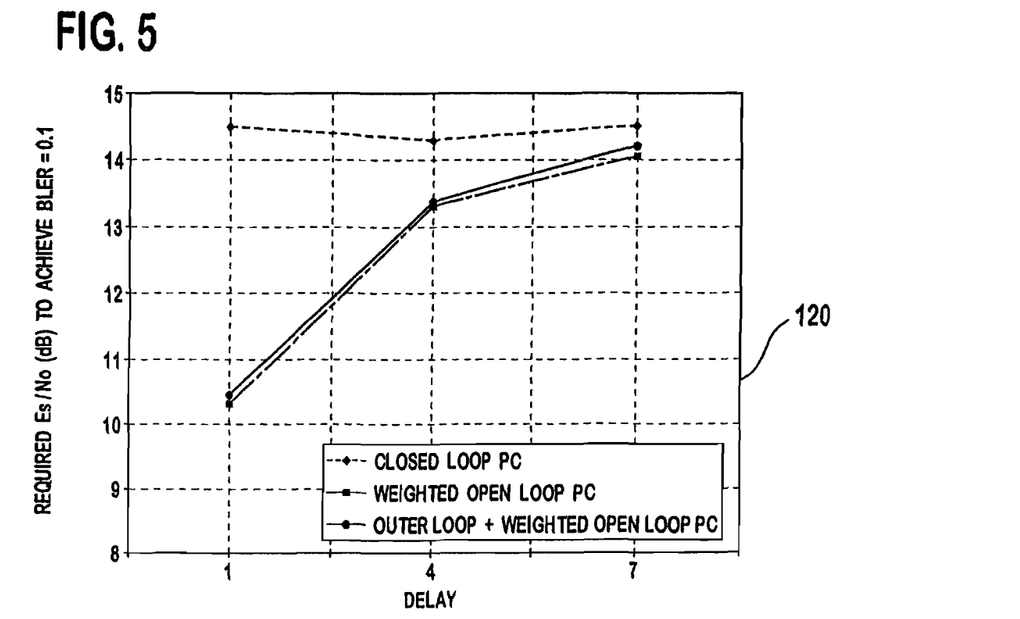
FIG. 5 is a graph of the performance of outer loop/weighted open loop, weighted open loop and closed loop power control systems.
Figure 6:
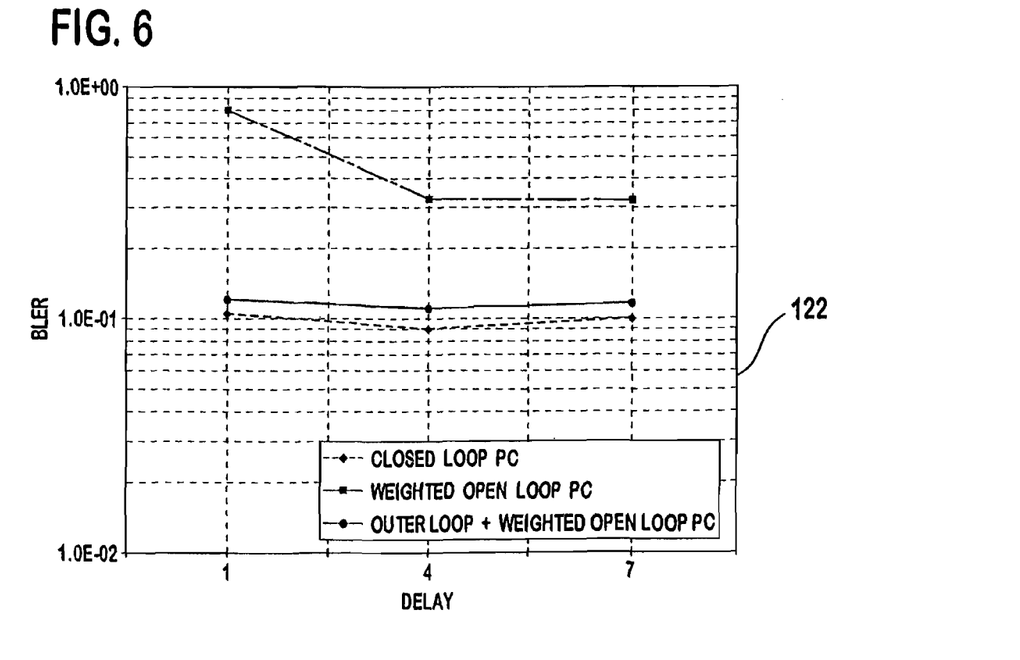
FIG. 6 is a graph of the three systems performance in terms of Block Error Rate (BLER).

FIGS. 5 and 6 compare the performance of the weighted outer loop/open loop, open loop and closed loop systems. The simulations in FIGS. 5 and 6 were performed for a slightly different version of the outer loop/weighted open loop algorithm. In this version, the target SIR is updated every block. A $SIR_{TARGET}$ is increased if a block error was detected and decreased if no block error was detected. The outer loop/weighted open loop system used Equation 2. Equation 3 was used to calculate α. The simulations compared the performance of the systems controlling a UE's $32_1$ transmission power level. For the simulations, 16 CRC bits were padded every block. In the simulation, each block was 4 frames. A block error was declared when at least two raw bit errors occur over a block. The uplink communication channel is assigned one time slot per frame. The target for the block error rate is 10%. The $SIR_{TARGET}$ is updated every 4 frames. The simulations address the performance of these systems for a UE $32_i$ traveling at 30 kilometers per hour. The simulated base station used two antenna diversity for reception with each antenna having a three finger RAKE receiver. The simulation approximated a realistic channel and SIR estimation based on a midamble sequence of burst type 1 field in the presence of additive white Gaussian noise (AWGN). The simulation used an International Telecommunication Union (ITU) Pedestrian B type channel and QPSK modulation. Interference levels were assumed to have no uncertainty. Channel coding schemes were not considered. $L_O$ was set at 0 db.

Graph 120 of FIG. 5 shows the performance as expected in terms of the required $E_S/N_O$ for a BLER of $10^{-1}$ as a function of time delay between the uplink time slot and the most recent downlink time slot. The delay is expressed by the number of time slots. $E_S$ is the energy of the complex symbol. FIG. 5 demonstrates that, when gain/interference uncertainties are ignored, the performance of the combined system is almost identical to that of weighted open loop system. The combined system outperforms the closed loop system for all delays.

In the presence of gain and interference uncertainties, the transmitted power level of the open loop system is either too high or too low of the nominal value. In graph 122 of FIG. 6, a gain uncertainty of −2 dB was used. FIG. 6 shows the BLER as a function of the delay. The initial reference $SIR_{TARGET}$ for each system was set to its corresponding nominal value obtained from FIG. 5, in order to achieve a BLER of $10^{-1}$. FIG. 6 shows that, in the presence of gain uncertainty, both the combined and closed loop systems achieve the desired BLER. The performance of the weighted open loop system severely degrades.

What is claimed is:

1. A user equipment comprising:
   circuitry configured to determine a pathloss associated with a received signal;
   circuitry configured to receive an adjustment and adjust a value in response to the received adjustment;
   circuitry configured to determine a transmit power level based on multiplying the determined pathloss by a parameter and adding the adjusted value to a result of the multiplying;
   wherein the parameter is value in the range of 0 to 1 and is based on a timeslot delay between a time slot of a last path loss estimate and a first time slot of a transmitted communication; and
   circuitry configured to transmit a signal at the determined transmit power level.

2. The user equipment of claim 1 wherein the pathloss is derived by measuring a received power level of the received signal.

3. The user equipment of claim 1 wherein the pathloss is derived by measuring a received power level of a control channel.

4. The user equipment of claim 1 wherein the pathloss is derived by measuring a received power level of a broadcast control channel.

5. The user equipment of claim 1 wherein the circuitry configured to determine the transmit power level is based on the multiplying the determined pathloss by the parameter and adding the adjusted value to the result of the multiplication and at least one other value received by the user equipment from a base station.

6. The user equipment of claim 1 wherein the adjustment is a power control adjustment.

7. The user equipment of claim 6 wherein the adjustment is an outer loop power control adjustment.

8. The user equipment of claim 1 wherein the circuitry for transmitting the signal transmits the signal over at least one time slot of a radio frame divided into time slots.

9. The user equipment of claim 8 comprising circuitry configured to transmit a subsequent signal over a subsequent at least one time slot and a transmit power level of the subsequent signal is determined by multiplying an updated determined pathloss by the parameter and adding an updated adjusted value to a result of the multiplication of the updated determined pathloss.

10. The user equipment of claim 1 comprising an antenna for radiating the transmitted signal.

11. The user equipment of claim 1 comprising circuitry operatively coupled to the antenna to demodulate signals received by the antenna to produce a baseband signal.

12. The user equipment of claim 1 wherein the received signal and the transmitted signal are in a code division multiple access format.

13. A user equipment comprising:
   a power measurement device and a pathloss estimation device configured to determine a pathloss associated with a received signal;
   an update device configured to receive an adjustment and adjust a value in response to the received adjustment;
   a transmit power calculation device configured to determine a transmit power level based on multiplying the determined pathloss by a parameter and adding the adjusted value to a result of the multiplying;
   wherein the parameter is value in the range of 0 to 1 and is based on a timeslot delay between a time slot of a last path loss estimate and a first time slot of a transmitted communication; and an amplifier and an antenna configured to transmit a signal at the determined transmit power level.

14. The user equipment of claim 13 wherein the power measurement device measures a received power level of the received signal.

15. The user equipment of claim 13 wherein the power measurement device measures a received power level of a control channel.

16. The user equipment of claim 13 wherein the power measurement device measures a received power level of a broadcast control channel.

17. The user equipment of claim 13 wherein the transmit power calculation device is configured to determine the transmit power level based on the multiplying the determined pathloss by the parameter and adding the adjusted value to the result of the multiplication and at least one other value received by the user equipment from a base station.

18. The user equipment of claim 13 wherein the adjustment is a power control adjustment.

19. The user equipment of claim 18 wherein the adjustment is an outer loop power control adjustment.

20. The user equipment of claim 13 wherein the amplifier and antenna are configured to transmit the signal over at least one time slot of a radio frame divided into time slots.

21. The user equipment of claim 20 wherein the amplifier and antenna are configured to transmit a subsequent signal over a subsequent at least one time slot and a transmit power level of the subsequent signal is determined by multiplying an updated determined pathloss by the parameter and adding an updated adjusted value to a result of the multiplication of the updated determined pathloss.

22. The user equipment of claim 13 comprising an isolator configured to separate the received and transmitted signals.

23. The user equipment of claim 13 comprising a demodulator configured to demodulate signals received by the antenna to produce a baseband signal.

24. The user equipment of claim 13 wherein the received signal and the transmitted signal are in a code division multiple access format.

25. A method comprising:
   determining a pathloss associated with a received signal by a user equipment (UE); receiving an adjustment and adjusting a value in response to the received adjustment by the UE;
   determining a transmit power level based on multiplying the determined pathloss by a parameter and adding the adjusted value to a result of the multiplying by the UE;
   wherein the parameter is value in the range of 0 to 1 and is based on a timeslot delay between a time slot of a last path loss estimate and a first time slot of a transmitted communication; and
   transmitting a signal at the determined transmit power level by the UE.

26. The method of claim 25 wherein the pathloss is derived by measuring a received power level of the received signal.

27. The method of claim 25 wherein the pathloss is derived by measuring a received power level of a control channel.

28. The method of claim 25 wherein the pathloss is derived by measuring a received power level of a broadcast control channel.

29. The method of claim 25 wherein the determined transmit power level is based on the multiplying the determined pathloss by the parameter and adding the adjusted value to the result of the multiplication and at least one other value received by the user equipment from a base station.

30. The method of claim 25 wherein the adjustment is a power control adjustment.

31. The method of claim 30 wherein the adjustment is an outer loop power control adjustment.

32. The method of claim 25 wherein the transmitting of the signal is over at least one time slot of a radio frame divided into time slots.

33. The method of claim 32 comprising transmitting a subsequent signal over a subsequent at least one time slot and a transmit power level of the subsequent signal is determined by multiplying an updated determined pathloss by the parameter and adding an updated adjusted value to a result of the multiplication of the updated determined pathloss.

34. The method of claim 25 comprising radiating the transmitted signal by an antenna of the UE.

35. The method of claim 25 comprising demodulating signals received by the antenna to produce a baseband signal.

36. The method of claim 25 wherein the received signal and the transmitted signal are in a code division multiple access format.

* * * * *